(12) United States Patent
Zheng

(10) Patent No.: US 9,014,093 B2
(45) Date of Patent: Apr. 21, 2015

(54) DIRECT COMMUNICATION METHOD AND DIRECT COMMUNICATION DEVICE AND COORDINATOR DEVICE USING THE SAME

(71) Applicant: Industrial Technology Research Institute, Hsinchu (TW)

(72) Inventor: Yan-Xiu Zheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 206 days.

(21) Appl. No.: 13/647,388

(22) Filed: Oct. 9, 2012

(65) Prior Publication Data

US 2013/0107801 A1 May 2, 2013

Related U.S. Application Data

(60) Provisional application No. 61/554,509, filed on Nov. 2, 2011.

(51) Int. Cl.
*H04W 4/00* (2009.01)
*H04W 52/28* (2009.01)
*H04W 72/04* (2009.01)
*H04W 74/08* (2009.01)

(52) U.S. Cl.
CPC .......... *H04W 52/281* (2013.01); *H04W 52/288* (2013.01); *H04W 72/0473* (2013.01); *H04W 74/0875* (2013.01); *Y02B 60/50* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–529
See application file for complete search history.

(56) References Cited

U.S. PATENT DOCUMENTS 6,738,638 B1 * 5/2004 Moulsley ...................... 455/517
2004/0151144 A1 * 8/2004 Benveniste .................. 370/336
(Continued)

FOREIGN PATENT DOCUMENTS

JP  2001516541  9/2001
JP  2002-016979  1/2002
(Continued)

OTHER PUBLICATIONS

"Search Report of Europe Counterpart Application", issued on Mar. 7, 2013, p. 1-p. 9.
(Continued)

*Primary Examiner* — Jung-Jen Liu
(74) *Attorney, Agent, or Firm* — Jianq Chyun IP Office

(57) ABSTRACT

A direct communication method, a direct communication device, and a coordinator device using the same method are provided. The direct communication method may be adapted for direct communications between devices with multiple priorities/power upper bounds/ranges. Multiple contention/transmission slots with different power upper bounds or priorities are used as a configuration to allocate resource for the direct communication. The associated configuration acquisition is also disclosed. The direct communication method may also adopt relative periodicity of occurrence of the contention/transmission slots, and may adaptively vary the relative periodicity. The direct communication method may include an associated monitor scheme for spectrum regulation.

50 Claims, 11 Drawing Sheets

(56) References Cited

U.S. PATENT DOCUMENTS

| | | | |
|---|---|---|---|
| 2004/0184477 A1* | 9/2004 | Tavli et al. | 370/461 |
| 2006/0023670 A1* | 2/2006 | Kim et al. | 370/337 |
| 2008/0165709 A1* | 7/2008 | Soliman | 370/280 |
| 2009/0111506 A1* | 4/2009 | Laroia et al. | 455/550.1 |
| 2009/0213815 A1* | 8/2009 | Sherman et al. | 370/336 |
| 2009/0323648 A1* | 12/2009 | Park et al. | 370/338 |
| 2009/0323697 A1* | 12/2009 | Celentano et al. | 370/395.42 |
| 2010/0189046 A1* | 7/2010 | Baker et al. | 370/329 |
| 2010/0195664 A1* | 8/2010 | Ho | 370/445 |
| 2010/0202354 A1* | 8/2010 | Ho | 370/328 |
| 2010/0226342 A1* | 9/2010 | Colling et al. | 370/336 |
| 2010/0291872 A1 | 11/2010 | Laroia et al. | |
| 2011/0021235 A1 | 1/2011 | Laroia et al. | |
| 2011/0205887 A1 | 8/2011 | Wu et al. | |
| 2012/0106397 A1* | 5/2012 | Abedi | 370/255 |
| 2013/0107801 A1* | 5/2013 | Zheng | 370/328 |
| 2013/0287043 A1* | 10/2013 | Nanda et al. | 370/467 |

FOREIGN PATENT DOCUMENTS

| | | |
|---|---|---|
| JP | 2009-017560 | 1/2009 |
| TW | I256203 | 6/2006 |
| TW | I333770 | 11/2010 |
| WO | 9614716 | 5/1996 |
| WO | 2006120990 | 11/2006 |
| WO | 2010100014 | 9/2010 |
| WO | 2011011636 | 1/2011 |

OTHER PUBLICATIONS

Gomez et al., "Using Variable-Range Transmission Power Control in Wireless Ad Hoc Networks", IEEE Transactions on Mobile Computing, Vol. 6, No. 1, Jan. 2007, p. 87-p. 99.

Al-Rahayfeh et al., "Parameterized Affect of Transmissionrange on Lost of Network Connectivity (LNC) of Wireless Sensor Networks", International Journal of Wireless & Mobile Networks, vol. 2, No. 3, Aug. 2010, p. 63-p. 80.

Saeed et al., "Medium Access Control: Variable Transmission Range in Wireless Ad-Hoc Networks", The 9th Annual Postgraduate Symposium on The Convergence of Telecommunications Networking and Broadcasting, Jun. 2008, p. 1-p. 6.

Zeng et al., "Multi-Rate Geographic Opportunistic Routing in Wireless Ad Hoc Networks", MILCOM 2007, Oct. 2007, p. 1-p. 7.

Ryoo et al., "Multi-sector multi-range control for self-organizing wireless networks", Journal of Network and Computer Applications, vol. 34, Dec. 2010, p. 1848-p. 1860.

Ahn et al., "Soft Reservation Multiple Access with Priority Assignment (SRMA/PA): A Distributed MAC Protocol for QoS-Guaranteed Integrated Services in Mobile Ad-Hoc Networks", IEICE Trans. Commun., vol. E86-B, No. 1, Jan. 2003, p. 50-59.

"Office Action of Korea Counterpart Application", issued on Mar. 31, 2014, with English translation thereof, p. 1-p. 19.

"Office Action of Japan Counterpart Application", issued on Feb. 18, 2014, p. 1-p. 2.

"Office Action of Taiwan Counterpart Application", issued on Sep. 22, 2014, p. 1-p. 11.

* cited by examiner

DIRECT COMMUNICATION METHOD AND DIRECT COMMUNICATION DEVICE AND COORDINATOR DEVICE USING THE SAME

CROSS-REFERENCE TO RELATED APPLICATION

This application claims the priority benefits of U.S. provisional application Ser. No. 61/554,509, filed on Nov. 2, 2011. The entirety of the above-mentioned patent applications is hereby incorporated by reference herein and made a part of this specification.

TECHNICAL FIELD

The disclosure relates to a direct communication method, a direct communication device using the same method and a coordinator device using the same method.

BACKGROUND

Direct communications and cellular communications have fundamental differences. Cellular communications would apply power control for all communication devices attaching to the network. When all communication devices connect to a base station (BS), the BS generally applies power control mechanism to adjust transmission power of each communication device. In other words, all communication devices could be served fairly. However, transmission power of direct communication is not centrally-coordinated. In order to increase successful network attachments or network associations or transmissions for direct communications, transmitting largest power may be the best policy. Especially for a random access procedure, a communication device may have no prior knowledge of a destination device, and the communication device would then transmit the largest power in the beginning to acquire the best chance of successful transmission. When all communication devices transmit at the largest power at the same time, all communication devices would collide together, and such situation may result in failed transmissions and failed associated frequency resources. In general, the larger the transmission power, the more communication devices are influenced, but the spectrum efficiency would be less.

On the other hand, the transmission range in a direct communication may influence the reception performance of a victim device or the overall direct communication system capacity. The larger the transmission range, the less direct communication devices could use identical time and frequency region simultaneously.

Direct communications would generally include two phases—a random access phase and a transmission phase. In a general direct communication process, the purpose of the random access phase is to build a link between a communication device and an access point, e.g. WiFi.

During the random access phase, a communication device would send a signal to an access point to content for its resource with other communication devices. The access point may acknowledge the communication device attached to the access point. The access point may further send the associated resource for a communication device to send messages to be followed. In a general direct communication process, the purpose of the transmission phase is to exchange messages between the communication device and the access point. The communication device would transmit data to the access point. The access point may acknowledge the communication device by sending the communication device data to be received.

During the random access phase, all communication devices content for similar transmission power and without priority. Multiple communication devices may content at the same time for frequency and time resources. If a communication device applies a lower transmission power, the communication device would have a less successful rate of transmission. As such, there would be some communication devices which can not content. Therefore, without predefined protocol(s), all communication devices would transmit at the largest power in order to reach an equal rate of successful transmission. Transmission in the largest power may imply less frequency re-use in the frequency domain, which further implies inefficient spectrum usage. As such, the conventional approach works only for a very small number of communication devices, e.g., only 10 communication devices in a WiFi network. However, such a small number of participating communication devices in the direct communications is not sufficient to support direct communications in a longer range, such a 1 km radius.

SUMMARY

The disclosure provides an exemplary embodiment of a direct communication method. According to the exemplary embodiment, the direct communication method is adapted to at least one communication device performing an random access, and includes the followings: a first communication device performing a random access in a contention slot wherein the contention slot comprises a first contention slot with a first transmission power upper bound and a second contention slot with a second transmission power upper bound and transmitting wireless signal at any transmission power less than the first transmission power upper bound of the first contention slot or the second transmission power upper bound of the second contention slot in which the first communication device participates in the contention.

The disclosure provides an exemplary embodiment of a direct communication method. According to the exemplary embodiment, the direct communication method is adapted to at least one communication device performing a data transmission, and includes the followings: a first communication device performing a data transmission in a transmission slot wherein the transmission slot comprises a first transmission slot with a first transmission power upper bound and a second transmission slot with a second transmission power upper bound and transmitting its wireless signal at any transmission power less than the first transmission power upper bound of the first transmission slot or the second transmission power upper bound of the second transmission slot in which the first communication device participates in the data transmission.

The disclosure provides an exemplary embodiment of a direct communication device. According to the exemplary embodiment, the direct communication device includes a transceiver unit and a communication protocol unit. The transceiver unit is configured for transmitting and receiving wireless signals. The communication protocol unit is connected to the transceiver unit, and is configured for performing a random access in a contention slot which comprises a first contention slot with a first transmission power upper bound and a second contention slot with a second transmission power upper bound with the communication device.

The disclosure provides an exemplary embodiment of a direct communication device. According to the exemplary embodiment, the direct communication device includes a transceiver unit and a communication protocol unit. The transceiver unit is configured for transmitting and receiving wireless signals. The communication protocol unit is connected to the transceiver unit, and is configured for performing a data transmission in a transmission slot comprising a first transmission slot with a first transmission power upper bound and a second transmission slot with a second transmission power upper bound and transmitting its wireless signal at any transmission power less than the first transmission power upper bound of the first transmission slot or the second transmission power upper bound of the second transmission slot in which the communication protocol unit participates in the data transmission.

The disclosure provides an exemplary embodiment of a coordinator device. According to the exemplary embodiment, the coordinator device includes a transceiver unit and a communication protocol unit. The transceiver unit is configured for transmitting and receiving wireless signals. The communication protocol unit is connected to the transceiver unit, and is configured for configuring one contention slot comprises at least a first contention slot with a first transmission power upper bound and at least a second contention slot with a second transmission power upper bound.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
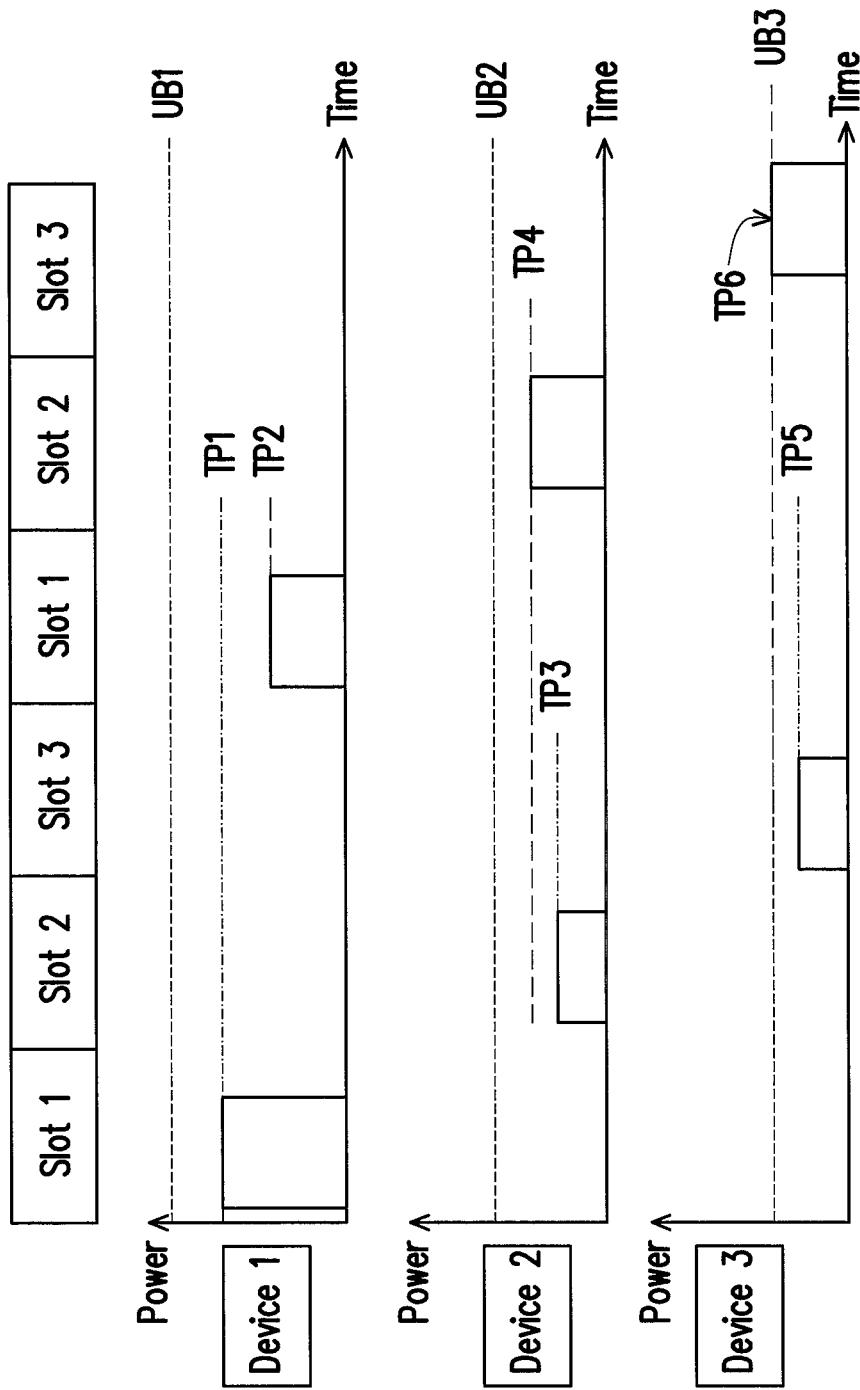
FIG. 1 is a schematic diagram illustrating multiple slots with different transmission power upper bounds adapted for direct communications according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure provides a direct communication method, a direct communication device using the same method and a coordinator device using the same method. For direct communications, a larger transmission range usually indicates a higher priority. In the direct communication method of the present disclosure, in order to increase spatial domain frequency reuse, transmission power could be constrained or upper limited. A new charging system may be implemented in proportional to the transmission power or the transmission range. A user would pay for transmission range in direct communications.

FIG. 1 is a schematic diagram illustrating multiple time slots with different transmission power upper bounds adapted for direct communications according to an exemplary embodiment. In the present embodiment, the direct communication method may be regarded as a time-division-multiplexed (TDM)-based Interference Control mechanism for direct communications, which may utilize TDM-based contention slots for direct communication devices configured with various transmission power configurations/priority level configurations. The TDM-based interference control mechanism may avoid signal suppression due to quantization errors from an analog-to-digital converter (ADC).

Referring to FIG. 1, for simplicity of illustration, there could be three slots such as a slot 1, a slot 2 and a slot 3 respectively configured with/ranked with different transmission power upper bounds such as a first upper bound UB1, a second upper bound UB2, and a third upper bound UB3. In the operation environment of the direct communication method of the present embodiments, there may be more than three direct communication devices attempting to perform their respective broadcasting/advertising/transmitting messages. For the simplicity of illustration, only three direct communication devices such as a direct communication device 1, a direct communication device 2 and a direct communication device 3 are taken for illustration.

In the exemplary illustration of FIG. 1, the direct communication device 1 is pre-configured/configured with the highest priority level/a maximum transmission power configuration; the direct communication device 2 is pre-configured/configured with a medium priority level/a medium transmission power configuration; the direct communication device 3 is pre-configured/configured with the lowest priority level/the minimum transmission power configuration. In the direct communication method, the direct communication device 1 contends for the slot 1 for random access/data transmission, where the slot 1 is configured with the first upper bound UB1; the direct communication device 2 contends for the slot 2 for random access/data transmission, where the slot 2 is configured with the second upper bound UB2; the direct communication device 3 contends for the slot 3 for random access/data transmission, where the slot 3 is configured with the third upper bound UB3.

When the direct communication device 1 contends for the slot 1 for random access/data transmission, the direct communication device 1 may transmit its wireless signal at any power less than the first upper bound UB1, such as a transmission power level TP1, and a transmission power level TP2. The direct communication device 1 does not transmit at a fixed transmission power at every pre-allocated slot (such as the slot 1), since its audience in the direct communications may vary as the distance between the direct communication device 1 and its current audience may vary accordingly. Thus, the direct communication device 1 may choose a lower transmission power for random access/data transmission as long as the transmission power is below the first upper bound UB1. Thereby, interference made to neighboring direct communication devices of the direct communication device 1 may be lowered, and power efficiency of the direct communication device 1 may be enhanced accordingly. Similarly, when the direct communication device 2 contends for the slot 2 for random access/data transmission, the direct communication device 2 may transmit its wireless signal at any power less than the second upper bound UB2, such as a transmission power level TP3, and a transmission power level TP4. Also, when the direct communication device 3 contends for the slot 3 for random access/data transmission, the direct communication device 3 may transmit its wireless signal at any power less than the second upper bound UB3, such as a transmission power level TP5, and a transmission power level TP6.

The approach of the proposed direct communication method may be applied a frame structure with different transmission power/priority level as shown in FIG. 1. There are at least two kinds of contention slots on the same frequency. These contention slots could be further divided in frequency domain into multiple channels to enhance successful random access probability. Additionally, code division multiplexed could be further applied to each contention slot.

Among these contention slots, they will be further classified into different transmission power levels or priority levels. The transmission power level may be a transmission power upper bound for these contention slots. For example, the power level could decade by at least 5 dB. For example: the maximum transmission power (i.e., the first upper bound UB1) is 23 dBm in the transmission slot 1, the maximum transmission power (i.e., the first upper bound UB2) is 13 dBm in transmission slot 2. Due to power limitation in different slots, the contention range will be different.

From device point of view, device will content according to its authorized priority or allowed transmission power. For example, in a contention slot 1, the transmission power level is the largest, and thus the transmission range is the largest. For another example, in a contention slot 3, the transmission power is the smallest and its spatial domain isolation could be achievable to enhance spectrum efficiency.

In the high transmission power level/priority slot, if the direct communication device is not allowed to transmit with such high transmission power or priority level, there are two approaches in this scenario. The first approach may be to limit the transmission power to the allowed level as the direct communication device is authorized. The second approach may be to restrict the direct communication device not to transmit its wireless signal at this slot.

Figure 2A:
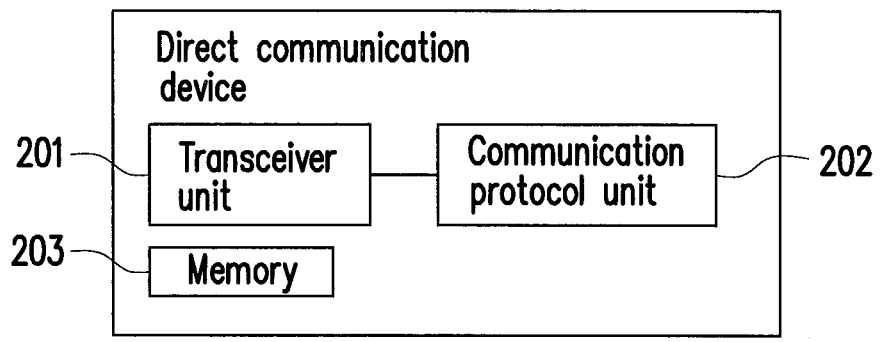
FIG. 2A is a functional block diagram of a direct communication device according to an exemplary embodiment.
Figure 2B:
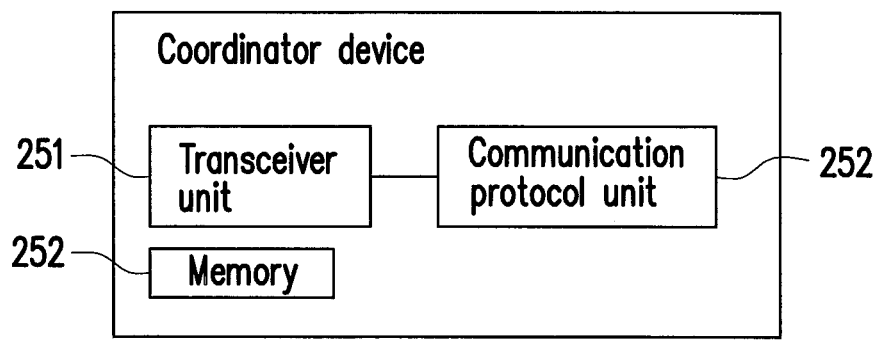
FIG. 2B is a functional block diagram of a coordinator device according to an exemplary embodiment.

The proposed direct communication method may be adapted to a direct communication device 20 as illustrated in FIG. 2A. Also, in some exemplary embodiments, there may be a coordinator device 25 configured to assist the proposed direct communication method, and a simple functional block diagram of the coordinator device is illustrated in FIG. 2B. FIG. 2A is a functional block diagram of a direct communication device according to an exemplary embodiment. Referring to FIG. 2A, the direct communication device 20 may include a transceiver unit 201, a communication protocol unit 202, and a memory 203. The transceiver unit 201 and the memory 203 are both connected to the communication protocol unit 202.

The transceiver unit 201 is configured to transmit wireless signals to other direct communicate device and receive wireless signals from other direct communication device. The transceiver unit 201 may perform analog-to-digital signal conversion (ADC), digital-to-analog signal conversion (DAC), modulation, demodulation, signal amplification, low-pass filtering, and bandpass filtering. The transceiver unit 201 is configured to provide information of a received RF signal (converted from a wireless signal received from other direct communication device or a wireless communication network) to the communication protocol unit 202, modulate data received from the communication protocol unit 202 into a modulated wireless signal, and transmit the modulated wireless signal to the wireless communication network or other direct communicate device.

The communication protocol unit 202 is connected to the transceiver unit 201. The communication protocol unit 202 is configured to receive wireless signals from direct communication device or a base station and process a command in the wireless signals (or executes corresponding operations according to parameters in the wireless signals). The communication protocol unit 202 includes a processor and an embedded software or firmware program. The embedded software or firmware program includes program codes of a communication protocol stack. When the processor of the communication protocol unit 202 executes the program codes of the communication protocol stack, the communication protocol unit 202 executes various procedures in the proposed direct communication method (which will be described below in the embodiments illustrated in FIG. 3-FIG. 11). For example, the communication protocol unit 202 may decode beacon signals through the communication protocol unit 201 received from other direct communication devices or any other communication devices apart from the direct communication devices. The communication protocol unit 202 may further acquire timing reference, transmission power configuration, or priority configuration from the decoded beacon signals. Further, the communication protocol unit 202 may content in contention slot(s)/transmission slot(s) for random access/data transmission through the transceiver unit 201.

The communication protocol unit 202 may further include a determination unit (not shown in FIG. 2A). The determination unit may be configured to perform value comparison in order to determine whether a received signal power level exceeds a pre-configured power level. The memory 203 may be configured for temporarily storing parameters, a transmission power configuration, timing configuration or a priority level configuration. In some embodiments, the memory 203 may be configured for temporarily storing parameters, a default transmission power configuration, timing configuration or a default priority level configuration.

Additionally, the direct communication device 20 may further include other components (not shown), such as a processor and an antenna module to accomplish aforementioned functions of the transceiver unit 201, the communication protocol unit 202, and the memory 203.

FIG. 2B is a functional block diagram of a coordinator device according to an exemplary embodiment. Referring to FIG. 2B, a coordinator device 25 may include a transceiver unit 251, a communication protocol unit 252, and a memory 253. The transceiver unit 251 and the memory 253 are both connected to the communication protocol unit 252.

The transceiver unit 251 is configured to transmit wireless signals to other direct communicate device and receive wireless signals from other direct communication device. The transceiver unit 251 may perform analog-to-digital signal conversion (ADC), digital-to-analog signal conversion (DAC), modulation, demodulation, signal amplification, low-pass filtering, and bandpass filtering. The transceiver unit 251 is configured to provide information of a received RF signal (converted from a wireless signal received from other direct communication device or a wireless communication network) to the communication protocol unit 252, modulate data received from the communication protocol unit 252 into a modulated wireless signal, and transmit the modulated wireless signal to the wireless communication network or other direct communicate device.

The communication protocol unit 252 is connected to the transceiver unit 251. The communication protocol unit 252 is configured to receive wireless signals from direct communication device or a base station and process a command in the wireless signals (or executes corresponding operations according to parameters in the wireless signals). The communication protocol unit 252 includes a processor and an embedded software or firmware program. The embedded software or firmware program includes program codes of a communication protocol stack. When the processor of the communication protocol unit 252 executes the program codes of the communication protocol stack, the communication protocol unit 252 executes various procedures in the proposed direct communication method (which will be described below in the embodiments illustrated in FIG. 3-FIG. 8 and FIG. 12). For example, the communication protocol unit 252 may broadcast beacon signal through the transceiver unit 251, or reply a configuration message/re-configuration message in response to a configuration request message received from other direct communication device(s) through the transceiver unit 251.

The communication protocol unit 252 may further include a determination unit (not shown in FIG. 2B). The determination unit may be configured to perform value comparison in order to determine whether a received signal power level exceeds a pre-configured power level. The memory 253 may be configured for temporarily storing parameters, a transmission power configuration, a timing configuration or a priority level configuration.

Additionally, the coordinator device 25 may further include other components (not shown), such as a processor and an antenna module to accomplish aforementioned functions of the transceiver unit 251, the communication protocol unit 252, and the memory 253.

Figure 3:
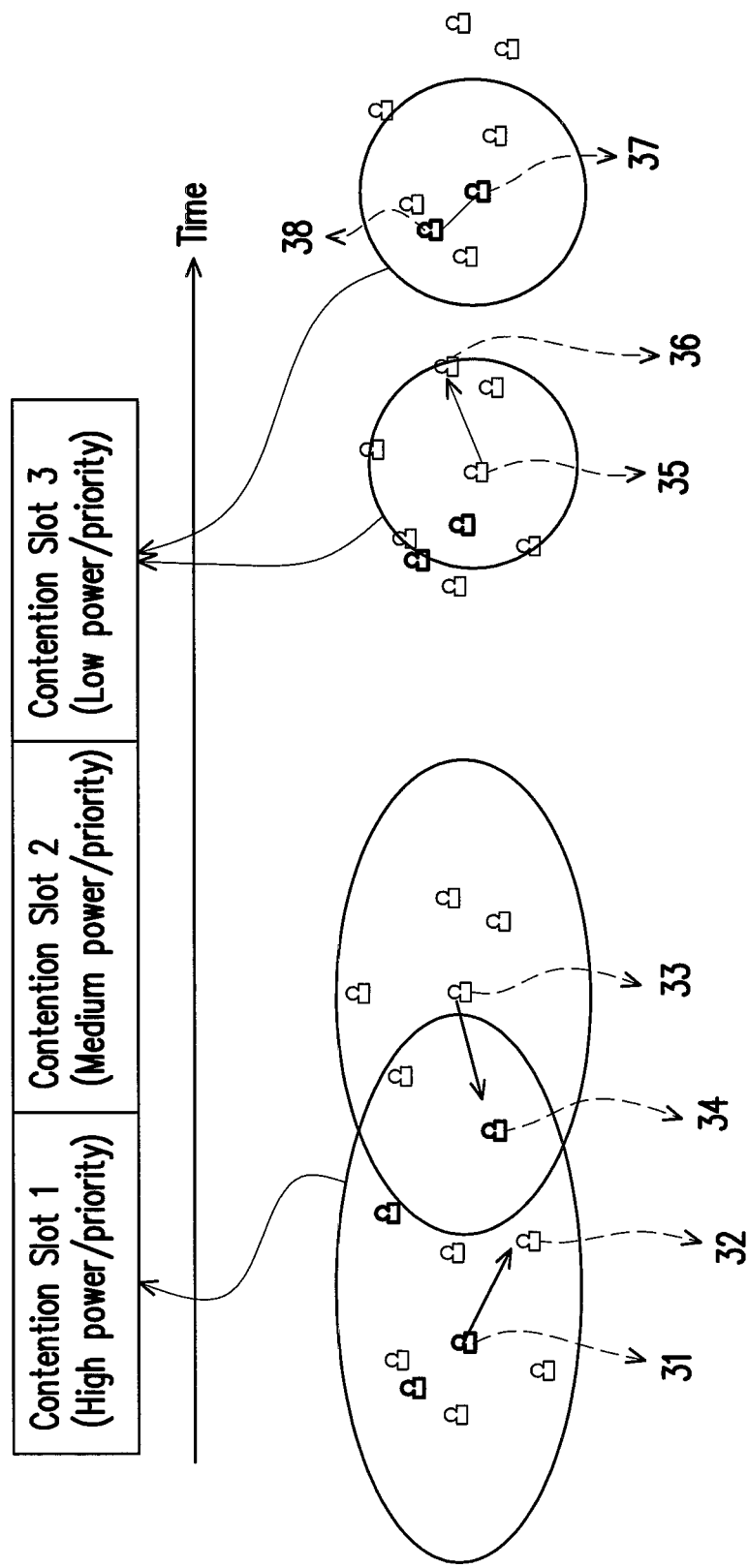
FIG. 3 is a schematic diagram of contention slots according to an exemplary embodiment.

FIG. 3 is a schematic diagram of contention slots according to an exemplary embodiment. Referring to FIG. 3, for example, there are contentions slots, 1, 2 and 3 shown in FIG. 3. The contention slot 1 may be allocated with/ranked with a high transmission power level/high priority level such as for a direct communication device 31 transmitting its wireless signal to another direct communication device 32, or a direct communication device 33 transmitting its wireless signal to another direct communication device 34. Compared with the contention slot 1, the contention slot 2 may be allocated with/ranked with a medium transmission power level/medium priority level such as another direct communication device transmitting its wireless signal to another direct communication device within a transmission range smaller than that of the direct communication devices 31, 33. Additionally, compared with the contention slot 1 and the contention slot 2, the contention slot 3 may be allocated with/ranked with a low transmission power level/low priority level such as a direct communication device 35 transmitting its wireless signal to another direct communication device 36 or a direct communication device 37 transmitting its wireless signal to another direct communication device 38 within a transmission range smaller than that of the direct communication devices 31, 33, 35.

Figure 4:
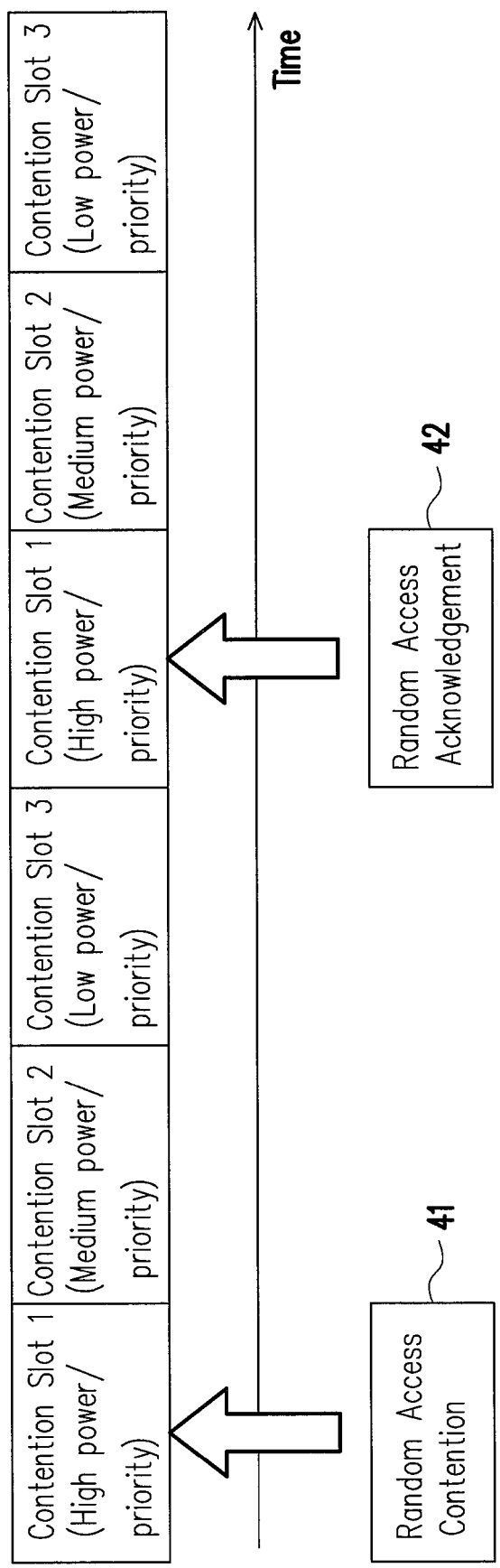
FIG. 4 is a schematic diagram of contention slots arranged in interlaced manner according to an exemplary embodiment.

The contention slots adapted for the proposed direct communication method could be constructed in an interlaced manner as shown in FIG. 4. For example, a prior sub-slot such as the contention slot 1 could be used for a random access contention 41 by the direct communication device 31. A later sub-slot such as another contention slot 1 could be used by a direct communication device transmitting a random access acknowledgement 42 configured to acknowledge the random access contention 41. In the present embodiment, resource allocation information could be carried as well in the random access acknowledgement 42, where the resource allocation information may be assigned by a coordinator device among the direct communication devices. In practical implementations, for example, the direct communication device 20 may use its communication protocol unit 202, through the transceiver unit 201, to receive a random access contention in a first contention slot, and then acknowledge the random access contention in a second contention slot.

Figure 5:
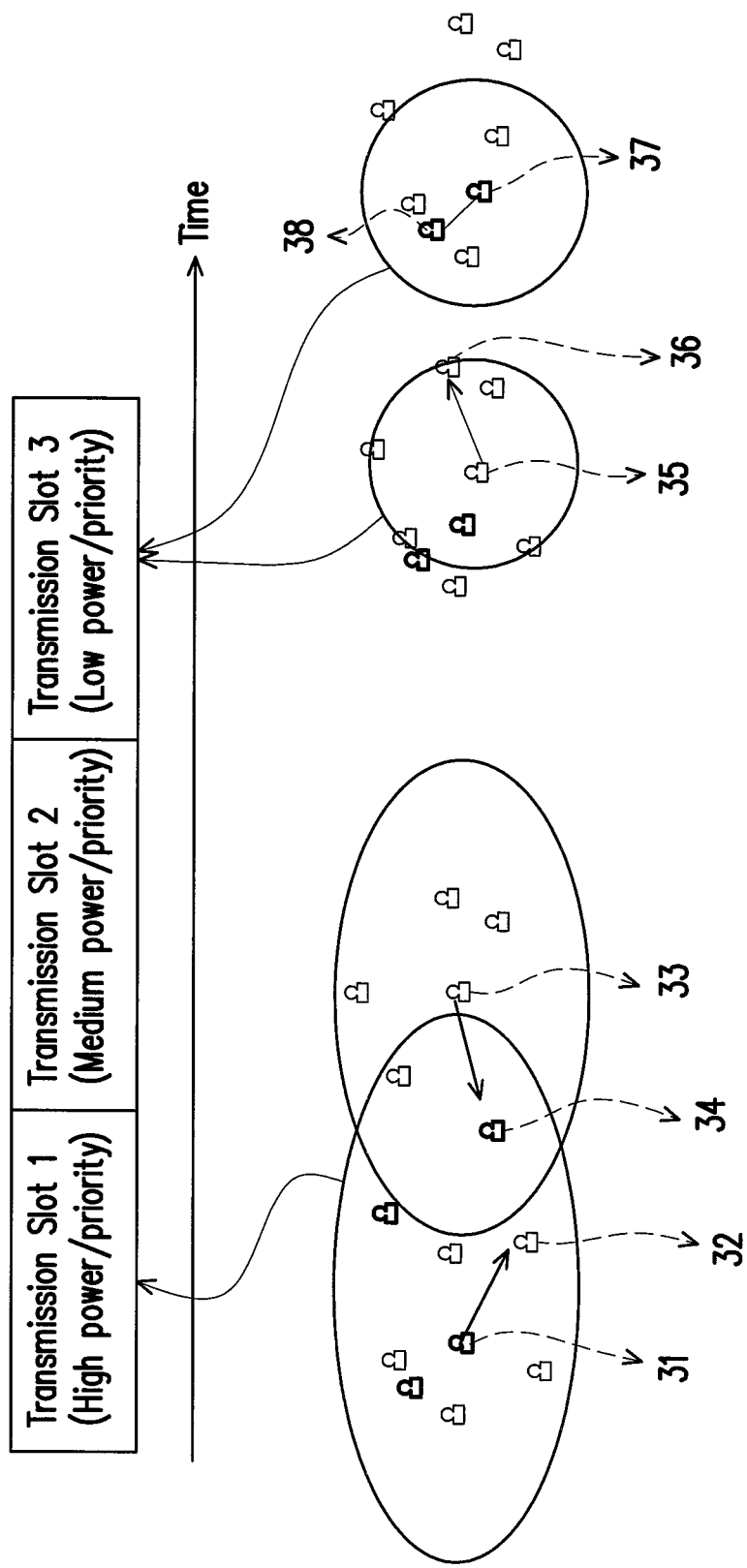
FIG. 5 is a schematic diagram of transmission slots according to an exemplary embodiment.

FIG. 5 is a schematic diagram of transmission slots according to an exemplary embodiment. A frame structure may be composed of transmission slots with different transmission power levels/priority levels as shown in FIG. 5. There are at least two kinds of transmission slots on the same frequency carrier. Among these transmission slots, the transmission slots may be further classified into different transmission power levels or priority levels. The transmission power level may be a transmission power upper bound for these transmission slots. The power transmission level could decade by at least 5 dB. For example: the maximum transmission power level is 23 dBm in the transmission slot 1, the maximum transmission power level is 13 dBm in transmission slot 2. Due to the transmission power upper limitation in different slots, the contention range of the transmission slots 1, 2 and 3 will be different from each other.

FIG. 5 illustrates an example for three kinds of contention slots. In a transmission slot 1, the transmission power is the largest and the transmission range is the largest. In a transmission slot 3, the transmission power is the smallest and spatial domain isolation could be achievable to enhance spectrum efficiency.

The transmission slots could be configured for paging or broadcast data signal. For the paging, a direct communication device may broadcast its information such as content, key index, place, category, device identifier (ID), the resource for detail information, and so like. If the paging is used in the transmission slot, the acknowledgement in a transmission phase could be omitted. In other embodiments, the random access phase prior to the transmission phase for the direct communication method may not be necessary either.

From transmission point of view, a direct communication device will transmit its wireless signal/message according to its authorized priority level or allowed transmission power level. In the high power/priority slot, if the direct communication device is not allowed to transmit with such high power or priority, there are two approaches in this scenario. The first approach is to limit the transmission power to the allowed level as the direct communication device is authorized. The second approach is to restrict the direct communication device not to transmit its wireless signal at this slot.

For example, the transmission slot 1 may be allocated for a high transmission power level/high priority level such as for the direct communication device 31 transmitting its wireless signal to another direct communication device 32, or a direct communication device 33 transmitting its wireless signal to another direct communication device 34. Compared with the contention slot 1, the transmission slot 2 may be allocated for the medium transmission power level/medium priority level such as another direct communication device 35 transmitting its wireless signal to another direct communication device within a transmission range smaller than that of the direct communication devices 31, 33. Additionally, compared with the contention slot 1 and the contention slot 2, the contention slot 3 may be allocated for the low transmission power level/ low priority level such as the direct communication device 35 transmitting its wireless signal to another direct communication device 36 or the direct communication device 37 to another direct communication device 38 within a transmission range smaller than that of the direct communication devices 31, 33, 35.

Figure 6:
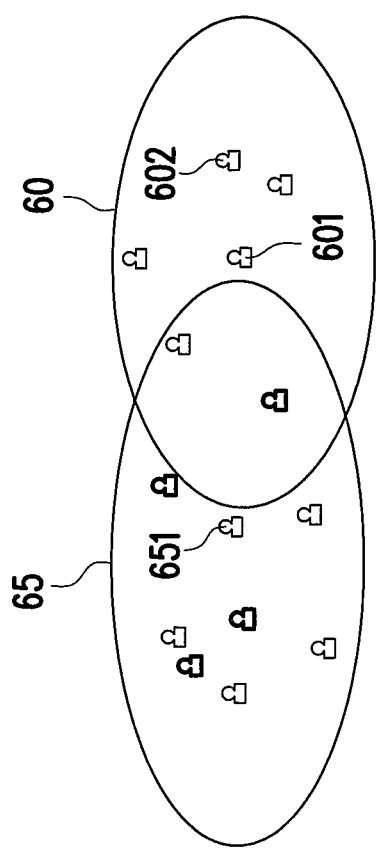
FIG. 6 illustrates a schematic diagram of timing reference acquisition according to an exemplary embodiment.

In embodiments of the present disclosure, the frame structure could be timing synchronous. In order to achieve the timing synchronization, every direct communication device needs to acquire timing reference, and there are proposed two approaches to acquire the timing reference. The first approach may need direct communication devices attach to a cellular communication system, a wireless access network, or a wireless-enabled positioning system such as a 3GPP low term evolution (LTE) system, a global system for mobile communication (GSM), a Worldwide Interoperability for Microwave Access (WiMAX) a third generation mobile communication system (3G), a wideband code division multiple access (WCDMA) network, a WiFi network, a code division multiple access 2000 (CDMA2000), a global positioning system (GPS). Thus, the direct communication devices may follow the reference timing from the cellular communication system, the wireless access network, or the wireless-enabled positioning system. For example, FIG. 6 illustrates a schematic diagram of timing reference acquisition according to an exemplary embodiment. Referring to FIG. 6, a communication device 651 may be a base station (or access point, etc), which is configured to broadcast timing reference signal to direct communication devices within its radio service coverage 65.

In other embodiments of the present embodiment, a direct communication device could broadcast a beacon signaling as the timing reference. For example, a direct communication device 601 may be the one which is configured to broadcast a beacon signaling as the timing reference, and other direct communication device such as a direct communication device 602 within the transmission range 60 of the direct communication device 601 can receive, decode and follow the timing reference of the decoded beacon signaling.

In embodiments of the present disclosure, in order to control interference, the proposed communication method may further include several TDM-based interference control mechanisms. The first category of TDM-based interference control mechanism is associated with the priority configuration acquisition. Transmission power level configuration/priority configuration should be informed to all direct communication devices. In order to acquire the transmission power level configuration/priority configuration, there are several approaches.

The first approach is a beacon-based approach. In the beacon-based approach, all direct communication devices have a default configuration. Every direct communication device receives an associated timing reference through beacon signaling such as the direct communication device 602 receive the associated timing reference from the direct communication device 601. A direct communication device may follow the default configuration based on the decoded beacon signaling to acquire the reference timing.

The second approach is a modified beacon-based approach. In the modified beacon-based approach, all direct communication devices have a default configuration. Every direct communication device receives an associated timing through beacon signaling such as the direct communication device 602 receive the associated timing reference from the direct communication device 601. The beacon signaling carries the associated transmission power level configuration/ priority configuration, and the direct communication device may follow the associated transmission power level configuration/priority configuration to acquire the reference timing.

The third approach is an infrastructure-based approach. In the infrastructure-based approach, a direct communication device may access an access point or a base station to request for the admission of spectrum access such as the a direct communication device within the radio service coverage 65 of the base station 651 may request the base station 651 for the admission of spectrum access. The access point device or the base station may send the associated configuration of priority level/transmission power level to the requesting direct communication device in response to the prior request.

The fourth approach is a device-based approach. In the device-based approach, a direct communication device such as the direct communication device 601 may transmit a beacon signaling. A newly-entered device such as the direct communication device 602 may use its communication protocol unit 202 to detect the beacon signaling to acquire the timing reference from the beacon signaling through the transceiver unit 201. The beacon signaling may carry the associated transmission power level configuration/priority configuration. In other embodiments, a newly-entered may request another direct communication device for the associated transmission power level configuration/priority configuration. In response to the request, the requested direct communication device replies the associated transmission power level configuration/priority configuration.

Figure 7:
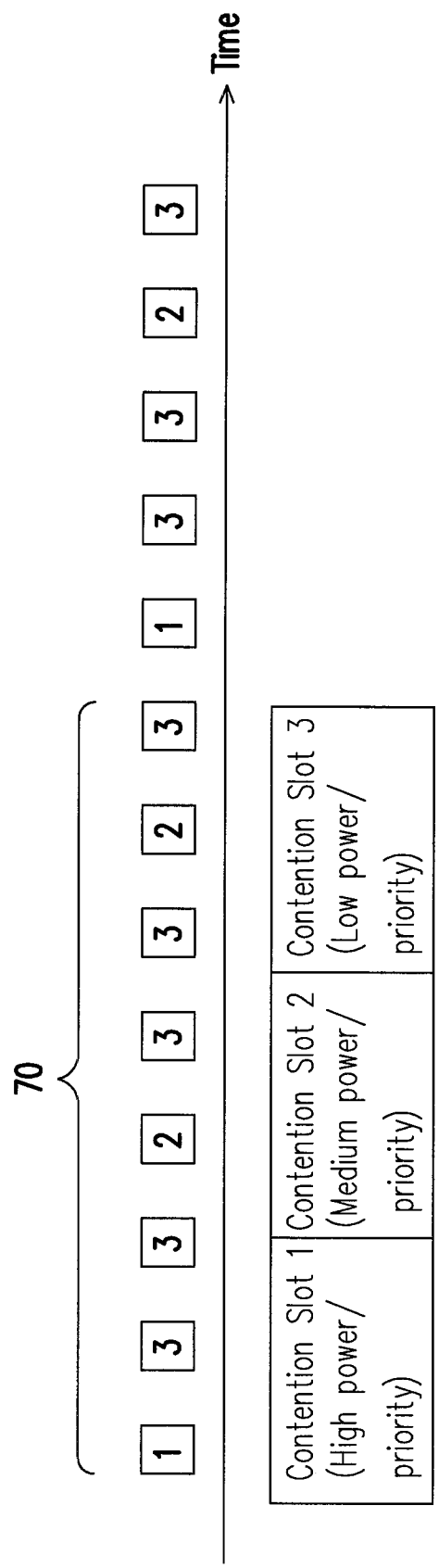
FIG. 7 is a schematic diagram illustrating different periodicity of contention slots based on transmission power level/priority level according to an exemplary embodiment.

FIG. 1 and FIGS. 3-5 illustrate frame structures of TDM-based contention slots/transmission slots according to exemplary embodiments. In the present disclosure, the proposed direct communication method may adjust periodicity of contention slot assignment/transmission slot assignment. FIG. 7 is a schematic diagram illustrating different periodicity of contention slots based on transmission power level/priority level according to an exemplary embodiment.

Referring to FIG. 7, in a predetermined cycle/pre-configured cycle, the occurrence of contention slots 1, 2, 3 vary with transmission power level or the priority level. In the present embodiment, the contention slot 1 allocated with the larger transmission power level or the higher priority level has less or equal occurrence to the contention slot 2 allocated with less transmission power level or lower priority level. This approach may increase transmission opportunities for most occurrence events.

For example, there are eight contention slots 70 in a pre-determined cycle as shown in FIG. 7. The contention slot 1 may occur once every eight contention slots. The contention slots 2 may occur twice every eight contention slots. The contention slots 3 may occur 5 times every eight contention slots.

However, the present disclosure is not limited to the aforementioned periodicity of contention slots. For an emergency case, the number of high priority contention slots might be not enough to support a large number of direct communication device contending for random access/data transmission at the same time, e.g. 1000 devices attempt to content within 1 second. Thus, the proposed direct communication method may include an adjustment procedure for varying the periodicity of contention slots in case of the emergency event.

Figure 8:
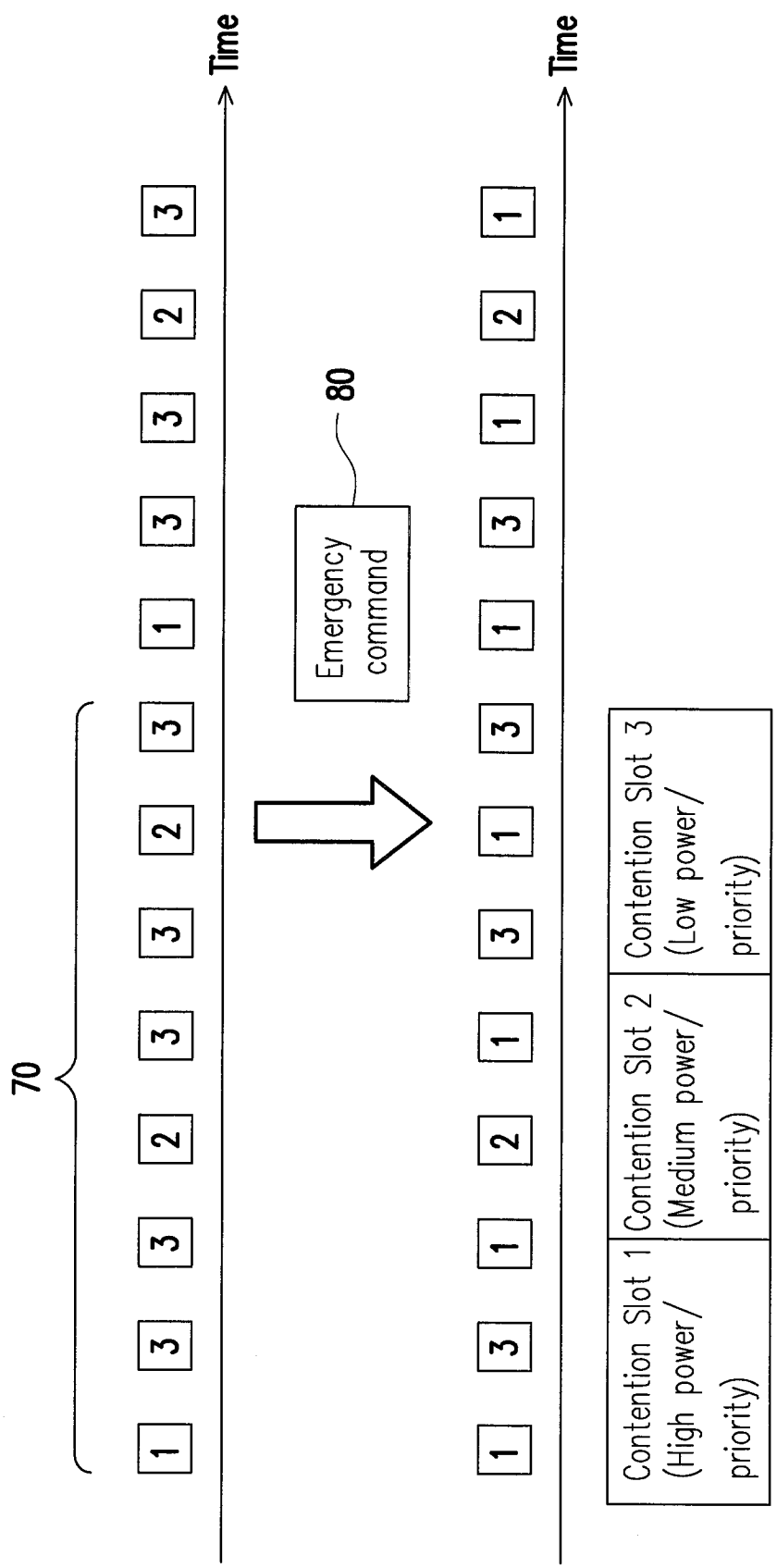
FIG. 8 illustrates a schematic diagram illustrating an adjustment of the periodicity of contention slots according to an exemplary embodiment.

FIG. 8 illustrates a schematic diagram illustrating an adjustment of the periodicity of contention slots according to an exemplary embodiment. The number of high priority or transmission power contention slots may be increased to improve the successful transmission opportunity. For example, when a direct communication device such as the direct communication device 601 use its communication protocol unit 252 to detect an emergency event through its transceiver unit 251, the direct communication device may transmit/broadcast an emergency command 80 to initiate an emergency configuration. The emergency command 80 may be flood to other direct communication devices. In order to prevent the flooding of emergency commands among the direct communication devices for multiple rounds, the emergency command may carry a timer to deactivate emergency scenario, and the direct communication device(s) may initiate the timer when receive the emergency command.

Referring to FIG. 8, in order to adjust the periodicity of contention slots in case of the emergency event based on the transmission power level/priority level, the direct communication device 601 as a coordinator device may flip all contention slots with identical transmission power level/priority level to the high transmission power/priority. The direct communication device 601 may also use bit-maps of the occurrence of the contention slot/the transmission slot with an identical transmission power level/priority level within a predetermined period to indicate which contention slots to be changed to high transmission power/priority.

Figure 9:
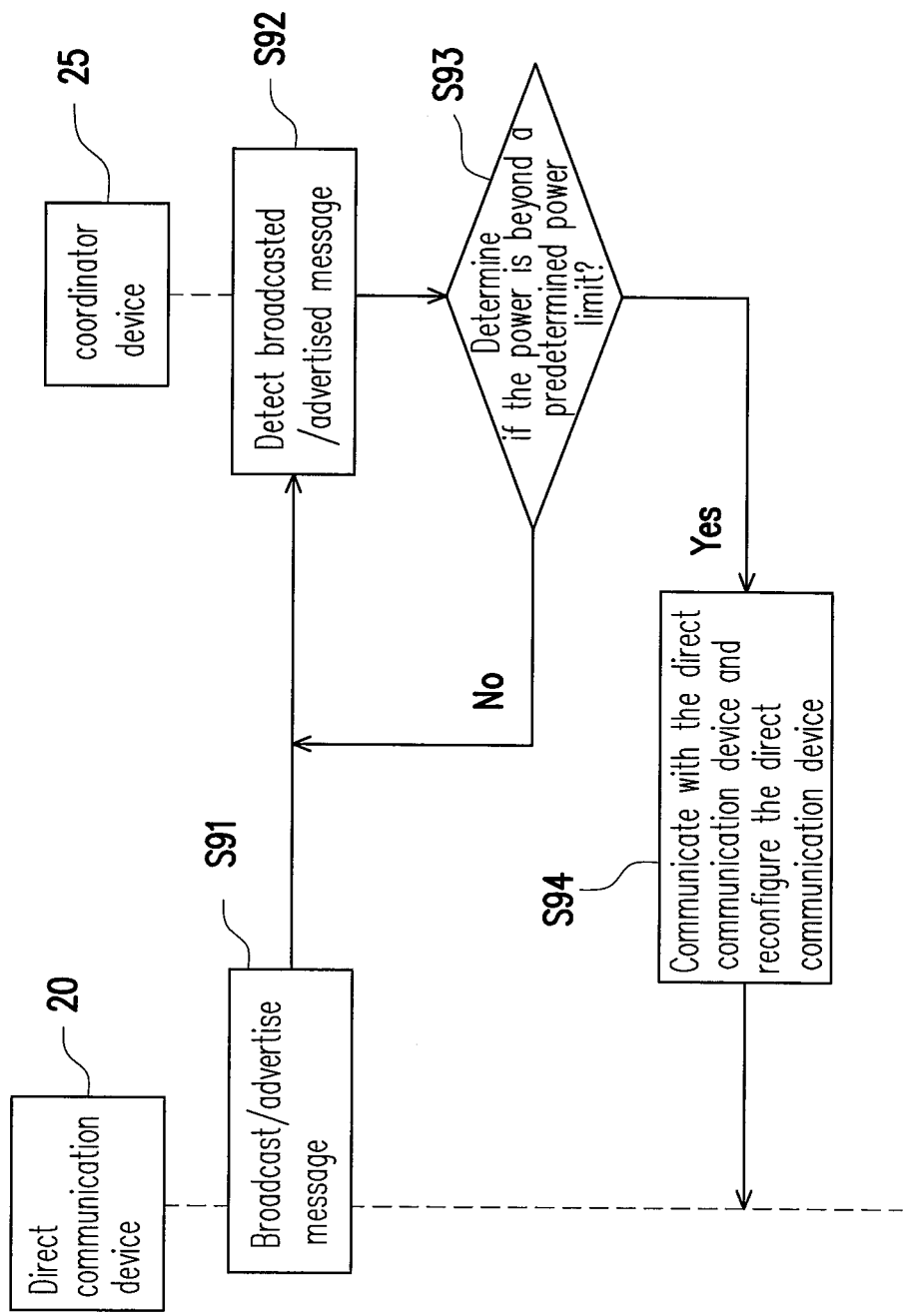
FIG. 9 is a flowchart of a method for monitoring transmission power according to an exemplary embodiment.

In the present disclosure, the proposed direct communication method may include procedures of spectrum monitoring in terms of monitoring transmission power of different direct communication devices. The proposed direct communication method may support a system monitoring. A monitoring system or a pre-configured direct communication device among the direct communication devices may monitor spectrum usage of the rest direct communication devices. In the present embodiment, the pre-configured direct communication device may be a coordinator device. When a direct communication device broadcasts message, the direct communication device will carry the associated power Tag and its ID along with the broadcast signal. The pre-configured direct communication device, the base station or the wireless access point station may monitor the power Tag and the associated ID to identify if the currently transmitting direct communication device violates a power transmission limit of the configuration. If the currently transmitting direct communication device transmits its wireless signal beyond the power limit, the re-configured direct communication device, the base station or the wireless access point station may communicate with the direct communication device to reconfigure the direct communication device. FIG. 9 is a flowchart of a method for monitoring transmission power according to an exemplary embodiment.

Referring to FIG. 9, the method for monitoring transmission power starts from step S91, in which a direct communication device 20 broadcasts/advertises a message (or its wireless signal) through in a contention slot according to its transmission power configuration/priority configuration, where the message or the wireless signal carries a power tag and the ID of the direct communication device 20.

In step S92, a coordinator device 25 detects the broadcasted/advertised message (or wireless signal). In step S93, the coordinator device 25 determines whether the received transmission power or the value of the power tag is greater than (or beyond) a predetermined transmission power limit according to the transmission power level configuration/the priority level of the currently transmitting direct communication device 20. When the received transmission power or the value of the power tag is greater than (or beyond) a predetermined transmission power limit, step S94 is executed after the step S93; otherwise, the step S92 is executed again after the step S93.

In the step S94, the coordinator device 25 may communicate with the direct communication device 20 and attempt to reconfigure the direct communication device 20. For example, the coordinator device 25 may transmit a message to the direct communication device 20, and inform the direct communication device 20 of violating the predetermined transmission power limit. Also, the coordinator device 25 may transmit a message (or a reconfiguration message) to the direct communication device 20, and then reconfigure the direct communication device 20 with a lower transmission power level/lower priority level. Then, the direct communication device 20 may adjusting its transmission power according to the reconfiguration message.

In the present disclosure, a direct communication device may acquire its priority configuration in several approaches. For example, a first approach may be to embed the priority configuration within a direct communication device. The direct communication device could store the priority in a memory such as the memory 203. The second approach may be that the direct communication device could access another direct communication device to acquire the priority configuration. The third approach may be that the direct communication device could access a network coordinator such as the coordinator device 25 which handles the priority authorization. The fourth approach may be that the direct communication device could access through a radio access network by another radio access technology such as WiMAX, LTE, universal terrestrial radio access (UTRA), GSM, GPRS, and so like to acquire its priority configuration.

Figure 10:
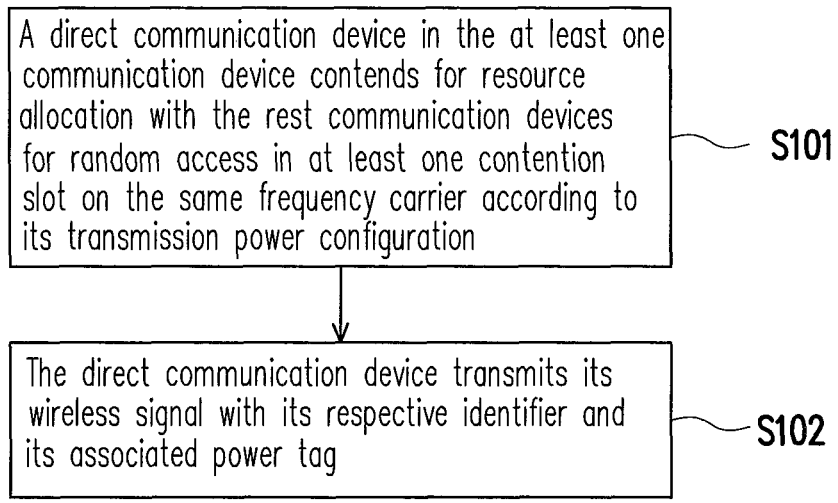
FIG. 10 is a flowchart of a direct communication method according to an exemplary embodiment.

FIG. 10 is a flowchart of a direct communication method according to an exemplary embodiment. Referring to FIG. 10, a direct communication method may be adapted to direct communication devices. For the simplicity of illustration, a direct communication device among the direct communication devices is considered as a subject matter in the illustration of procedures. The proposed direct communication method starts from step S101, in which a direct communication device in the at least one communication device contends for resource allocation with the rest communication devices for random access in at least one contention slot on the same frequency carrier according to its transmission power configuration. In practical implementations, for example, a direct communication device 20 may use its communication protocol unit 202 to contend for resource allocation with the rest communication devices for random access in at least one contention slots on the same frequency carrier according to its transmission power configuration through the transceiver unit 201, where the communication protocol unit 202 has acquired the transmission power configuration previously and records the transmission power configuration.

In the step S102, the direct communication device transmits its wireless signal with its respective identifier and its associated power tag. In practical implementations, for example, a direct communication device 20 may use its communication protocol unit 202 to transmit its wireless signal with its respective identifier and its associated power tag through the transceiver unit 201, where the communication protocol unit 202 may record the associated power tag and its identifier in the memory 203.

Figure 11:
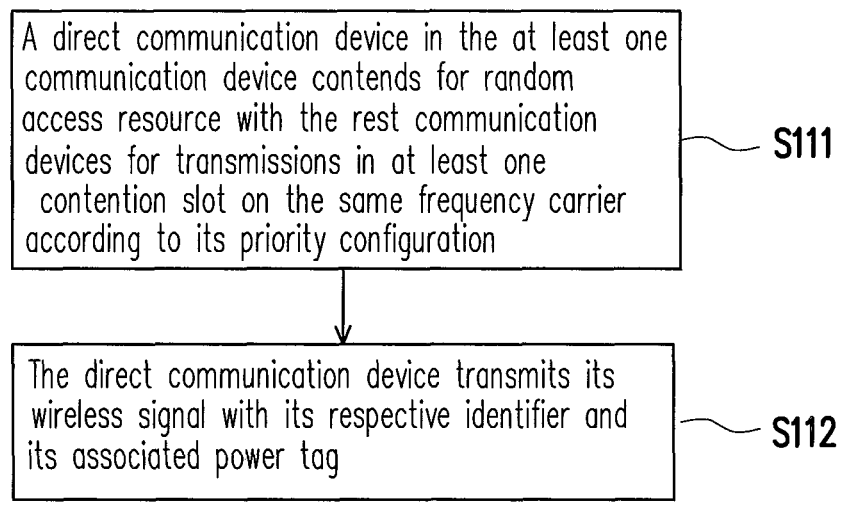
FIG. 11 is a flowchart of a direct communication method according to an exemplary embodiment.

FIG. 11 is a flowchart of a direct communication method according to an exemplary embodiment. Referring to FIG. 11, a direct communication method may be adapted to direct communication devices. For the simplicity of illustration, a direct communication device among the direct communication devices is considered as a subject matter in the illustration of procedures. The proposed direct communication method starts from step S111, in which a direct communication device in the at least one communication device contends for resource allocation with the rest communication devices for random access in at least one contention slots on the same frequency carrier according to its priority configuration. In practical implementations, for example, a direct communication device 20 may use its communication protocol unit 202 to contends for resource allocation with the rest communication devices for random access in at least one contention slots on the same frequency carrier according to its priority configuration through the transceiver unit 201, where the communication protocol unit 202 has acquired the transmission power configuration previously and records the transmission power configuration.

In the step S112, the direct communication device transmits its wireless signal with its respective identifier and its associated power tag. In practical implementations, for example, a direct communication device 20 may use its communication protocol unit 202 to transmit its wireless signal with its respective identifier and its associated power tag through the transceiver unit 201, where the communication protocol unit 202 may record the associated power tag and its identifier in the memory 203.

Figure 12:
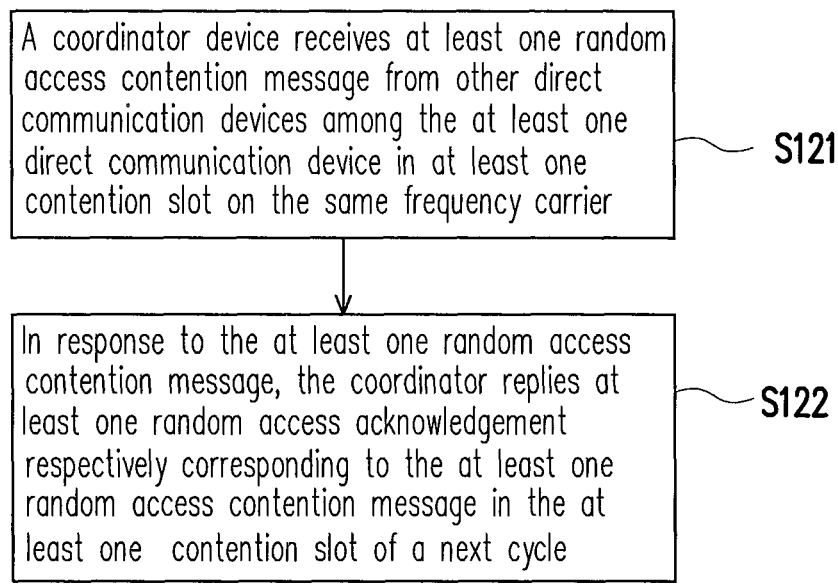
FIG. 12 is a flowchart of a direct communication method according to an exemplary embodiment.

FIG. 12 is a flowchart of a direct communication method according to an exemplary embodiment. Referring to FIG. 12, a direct communication method may be adapted to a coordinator device which may be one of the direct communication devices. For the simplicity of illustration, the coordinator device is considered as a subject matter in the illustration of procedures. The proposed direct communication method starts from step S121, in which a coordinator device receives at least one random access contention message from other direct communication devices among the at least one direct communication devices in at least one contention slots on the same frequency carrier. In practical implementations, for example, a coordinator device 25 may use its communication protocol unit 252 receives at least one random access contention message from other direct communication devices among the at least one direct communication devices in at least one contention slots on the same frequency carrier through the transceiver unit 251.

In step S122, in response to the at least one random access contention message, the coordinator device replies at least one random access acknowledgement corresponding to the random access contention message to reconfigure transmission power of the direct communication device if the power tag indicates the transmission power beyond the transmission power upper bound on the corresponding contention slot. In practical implementations, for example, the communication protocol unit 252 of the coordinator device 25 may reply at least one random access acknowledgement corresponding to the at least one random access contention message in the at least one contention slots.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A direct communication method, adapted to a first communication device performing a random access, the method comprising:

performing a random access in at least a first contention slot or a second contention slot wherein the first contention slot has a first transmission power upper bound and the second contention slot has a second transmission power upper bound which is different from the first transmission upper bound;

detecting a beacon signal to acquire a default timing in response to entering a direct communication network;

acquiring a transmission power configuration from the beacon signal or receiving the transmission power configuration externally;

transmitting wireless signal at any transmission power less than the first transmission power upper bound in the first contention slot or the second transmission power upper bound in the second contention slot according to the transmission power configuration in which the first communication device participates in the random access in the at least the first contention slot or the second contention slot;

transmitting in the first contention slot when the transmission power configuration is corresponding to the first transmission power upper bound; and transmitting in the second contention slot when the transmission power configuration is corresponding to the second transmission power upper bound.

2. The method of claim 1, further comprising:

after performing the random access in the first contention slot, the first communication device receives a random access acknowledgment.

3. The method of claim 1, further comprising:

after the random access in the second contention slot, the first communication device receives a random access acknowledgment corresponding to the first contention slot.

4. The method of claim 3, further comprising:

After receiving the random access acknowledgement corresponding to the first contention slot, a second communication device receives a random access acknowledgment corresponding to the second contention slot after performing the random access on the second contention slot.

5. The method of claim 1, further comprising:

the first communication device aligning its timing with a cellular communication system.

6. The method of claim 1, wherein detecting the beacon signal to acquire the default timing further comprising:

the first communication device aligning its timing with a second communication device by following a beacon signal of the second communication device.

7. The method of claim 1, further comprising:

The first communication device acquiring its transmission configuration by following a beacon signal or a message from a cellular communication system.

8. The method of claim 7, wherein the step of acquiring its transmission configuration by following the beacon signal or the message from the cellular communication system comprises:

receiving and decoding the beacon signal;

receiving an associated timing in the decoded beacon signal; and acquiring its transmission configuration by following a default transmission configuration based on the associated timing.

9. The method of claim 7 wherein the step of acquiring its transmission configuration by following the beacon signal or the message from the cellular communication system comprises:

receiving and decoding the beacon signal;
receiving an associated timing in the decoded beacon signal; and
acquiring its transmission configuration by following the associated timing.

10. The method of claim 7 wherein the step of following the beacon signal or the message from the cellular communication system comprises:
the first communication device requesting a coordinator device for spectrum access admission; and
the first communication device receiving the transmission power configuration from the coordinator device.

11. The method of claim 6 wherein the step of the first communication device aligning its timing with the second communication device by following the beacon signal of the second communication device comprises:
when the first communication device newly enters the direct communication network, the first communication device detects the beacon signal from the second communication device to acquire the default timing; and
the first communication device acquiring associated transmission power configuration from the beacon signal, or the first communication device requesting the second communication device for the associated transmission power configuration.

12. The method of claim 1, further comprising:
receiving an emergency command; and
adapting the occurrence of the contention slot within a predetermined time cycle according to the emergence command.

13. The method of claim 6 further comprises:
receiving a reconfiguration message from the second communication device; and
adjusting its transmission power according to the reconfiguration message.

14. The method of claim 1, wherein the two contention slots are time division multiplexed.

15. The method of claim 1, wherein the wireless signal comprises an identifier and a power tag of the first communication device.

16. The method of claim 1, wherein the first transmission power upper bound and the second transmission power upper bound have least 5 dB difference.

17. A direct communication method, adapted to a first communication device performing a data transmission, the method comprising:
performing the data transmission in at least a first transmission slot or a second transmission slot wherein the first transmission slot has a first transmission power upper bound and the second transmission slot has a second transmission power upper bound which is different from the first transmission upper bound;
detecting a beacon signal to acquire a default timing in response to entering a direct communication network;
acquiring a transmission power configuration from the beacon signal or receiving the transmission power configuration externally;
transmitting its wireless signal at any transmission power less than the first transmission power upper bound in the first transmission slot or the second transmission power upper bound in the second transmission slot according to the transmission power configuration in which the first communication device participates in the random access in the at least the first transmission lot or the second transmission slot;
transmitting in the first transmission slot when the transmission power configuration is corresponding to the first transmission power upper bound; and
transmitting in the second transmission slot when the transmission power configuration is corresponding to the second transmission power upper bound.

18. The method of claim 17 further comprising,
performing a random access in a first contention slot according to the first transmission power upper bound before performing the data transmission in the at least the first transmission slot or the second transmission slot.

19. The method of claim 17 further comprises:
receiving a random access acknowledgment.

20. The method of claim 17, wherein the first transmission power upper bound and the second transmission power upper bound have least 5 dB difference.

21. A first communication device, comprising:
a transceiver unit, configured for transmitting and receiving wireless signals with a communication device; and
a communication protocol unit, coupled to the transceiver unit, configured for
performing a random access in at least a first contention slot with a first transmission power upper bound and a second contention slot with a second transmission power upper bound which is different from the first transmission upper bound;
detecting a beacon signal to acquire a default timing in response to entering a direct communication network;
acquiring a transmission power configuration from the beacon signal or receiving the transmission power configuration externally;
transmitting wireless signal at any transmission power less than the first transmission power upper bound in the first contention slot or the second transmission power upper bound in the second contention slot according to the transmission power configuration in which the first communication device participates in the random access in the at least the first contention slot or the second contention slot;
transmitting in the first contention slot when the transmission power configuration is corresponding to the first transmission power upper bound; and
transmitting in the second contention slot when the transmission power configuration is corresponding to the second transmission power upper bound.

22. The device of claim 21, wherein
after performing the random access in the first contention slot, the communication protocol unit is further configured for receiving a random access acknowledgment.

23. The device of claim 21, wherein
after the random access in the second contention slot, the communication protocol unit is further configured for receiving a random access acknowledgment corresponding to the first contention slot.

24. The device of claim 23, wherein
after receiving the random access in the first contention slot, the communication protocol unit is further configured for receiving a second random access acknowledgment corresponding to the second slot.

25. The device of claim 21, wherein the communication protocol unit is further configured for transmitting its wireless signal at any transmission power less than the first transmission power upper bound of the first contention slot in which the first communication device participates in a contention.

26. The device of claim 21, wherein the communication protocol unit is configured for detecting the beacon signal to acquire the default timing comprising:
  aligning its timing with a second communication device by following a beacon signal of the second communication device.

27. The device of claim 21, wherein the communication protocol unit is further configured for acquiring its transmission configuration by following a beacon signal or a message from a cellular communication system.

28. The device of claim 27, wherein the communication protocol unit is further configured for acquiring its transmission configuration by following the beacon signal or the message from the cellular communication system comprises:
  receiving and decoding the beacon signal;
  receiving an associated timing in the decoded beacon signal; and
  acquiring its transmission configuration by following a default transmission configuration based on the associated timing.

29. The device of claim 27, wherein the communication protocol unit is further configured for acquiring its transmission configuration by following the beacon signal or the message from the cellular communication system comprises:
  requesting a coordinator device for spectrum access admission; and
  receiving a transmission power configuration from the coordinator device.

30. The device of claim 26, wherein the communication protocol unit is configured for aligning its timing with the second communication device by following the beacon signal of the second communication device comprises:
  when a first communication device newly enters the direct communication network, the first communication device detects the beacon signal from the second communication device to acquire the default timing; and
  the first communication device acquiring associated transmission power configuration from the beacon signal, or the first communication device requesting the second communication device for the associated transmission power configuration.

31. The device of claim 21, wherein the communication protocol unit is further configured for:
  receiving an emergency command; and
  adapting the occurrence of the contention slot within a predetermined cycle according to the emergence command.

32. The device of claim 30, wherein the communication protocol unit is further configured for:
  receiving a reconfiguration message from the second communication device; and
  adjusting its transmission power according to the reconfiguration message.

33. The device of claim 21, wherein the first transmission power upper bound and the second transmission power upper bound have least 5 dB difference.

34. A first communication device, comprising:
  a transceiver unit, configured for transmitting and receiving wireless signals with a communication device; and
  a communication protocol unit, coupled to the transceiver unit, configured for
    performing a data transmission in at least a first transmission slot or a second transmission slot wherein the first transmission slot has a first transmission power upper bound and the second transmission slot has a second transmission power upper bound which is different from the first transmission upper bound;
    detecting a beacon signal to acquire a default timing in response to entering a direct communication network;
    acquiring a transmission power configuration from the beacon signal or receiving the transmission power configuration externally;
    transmitting its wireless signal at any transmission power less than the first transmission power upper bound in the first transmission slot or the second transmission power upper bound in the second transmission slot according to the transmission power configuration in which the communication protocol unit participates in the random access in the at least the first transmission slot or the second transmission slot;
    transmitting in the first transmission slot when the transmission power configuration is corresponding to the first transmission power upper bound; and
    transmitting in the second transmission slot when the transmission power configuration is corresponding to the second transmission power upper bound.

35. The device of claim 34, wherein before the communication protocol unit performs the data transmission in the at least the first transmission slot or the second transmission slot, the communication protocol unit is further configured for:
  performing a random access in a first contention slot according to the first transmission power upper bound.

36. The device of claim 34, wherein the communication protocol unit is further configured for:
  receiving a random access acknowledgment.

37. The device of claim 34, wherein the two transmission slots are ranked with different transmission power upper bounds.

38. The device of claim 34, wherein the first transmission power upper bound and the second transmission power upper bound have least 5 dB difference.

39. A direct communication method, adapted to a coordinator device among at least two direct communication devices, comprising:
  configuring one contention slot comprises at least a first contention slot with a first transmission power upper bound and at least a second contention slot with a second transmission power upper bound which is different from the first transmission power upper bound;
  identifying power tags and associated identifiers respectively corresponding to the direct communication devices;
  determining whether any power value of the power tags exceeds a transmission power limit according to the associated identifier of the power tags and transmission power configurations of the direct communication devices; and
  receiving a request message from a newly entered direct communication device, wherein the request message requests for a transmission power configuration or a priority configuration of the newly entered direct communication device; and
  in response to the request message, transmitting the transmission power configuration or the priority configuration to the newly entered direct communication device.

40. The direct communication method of claim 39, wherein the direct communication devices are configured with an allowed transmission power configuration or a priority level.

41. The direct communication method of claim 39, further comprising:

transmitting a timing reference beacon signal to the other direct communication devices among the direct communication devices.

42. The direct communication method of claim 41, further comprising:
transmitting a transmission power configuration or a priority configuration corresponding to the direct communication devices in the timing reference beacon signal.

43. The direct communication method of claim 39, further comprising:
in response to an emergency event, the coordinator device broadcasting an emergency command, wherein the emergency command is configured to adjust the occurrence of the at least two contention slots within a predetermined cycle.

44. The direct communication method of claim 39, further comprising:
in response to an emergency event, the coordinator device broadcasting an emergency command, wherein the emergency command is configured to adjust the occurrence of a transmission slots in which the direct communication devices contends for data transmission within a predetermined cycle.

45. The direct communication method of claim 39, wherein before the step of identifying power tags and associated identifiers respectively corresponding to the direct communication devices, the communication method further comprising:
the coordinator device detecting wireless signal of the direct communication devices.

46. The direct communication method of claim 39, further comprising:
when the coordinator device determines that one power tag exceeds the transmission power limit of a transmission power configuration of a transmitting direct communication device, the coordinator device transmitting a reconfiguration message to the transmitting direct communication device to lower the power value of the power tag of the transmitting direct communication device.

47. A coordinator device, comprising:
a transceiver unit, configured for transmitting and receiving wireless signals; and
a communication protocol unit, connected to the transceiver unit, configuring one contention slot comprises at least a first contention slot with a first transmission power upper bound and at least a second contention slot with a second transmission power upper bound which is different from the first transmission upper bound;
identifying power tags and associated identifiers respectively corresponding to the direct communication devices;
determining whether any power value of the power tags exceeds a transmission power limit according to the associated identifier of the power tags and transmission power configurations of the direct communication devices; and
receiving a request message from a newly entered direct communication device, wherein the request message requests for a transmission power configuration or a priority configuration of the newly entered direct communication device; and
in response to the request message, transmitting the transmission power configuration or the priority configuration to the newly entered direct communication device.

48. The coordinator device of claim 47, wherein:
the communication protocol unit is further configured for transmitting a timing reference beacon signal through the transceiver unit to the other direct communication devices among the direct communication devices.

49. The coordinator device of claim 47 wherein:
in response to an emergency event, the communication protocol unit is further configured for broadcasting an emergency command through the transceiver unit, wherein the emergency command is configured to adjust the occurrence of the contention slot within a predetermined cycle.

50. The coordinator device of claim 47, wherein:
when the communication protocol unit determines that a power value of the power tag exceeds a transmission power limit of a transmission power configuration of a transmitting direct communication device associated with the power tag, the communication protocol unit is further configured for transmitting a reconfiguration message to lower the power value of the power tag of the transmitting direct communication device.

* * * * *